(12) United States Patent
Costain et al.

(10) Patent No.: US 7,559,847 B2
(45) Date of Patent: Jul. 14, 2009

(54) CUE STICK

(75) Inventors: Paul D. Costain, Lakeland, FL (US); Karim Belhaj, Jacksonville, FL (US)

(73) Assignee: Clawson Custom Cues, Inc., Jacksonville, FL (US)

( * ) Notice: Subject to any disclaimer, the term of this patent is extended or adjusted under 35 U.S.C. 154(b) by 0 days.

(21) Appl. No.: 11/879,491

(22) Filed: Jul. 17, 2007

(65) Prior Publication Data

US 2008/0026861 A1  Jan. 31, 2008

Related U.S. Application Data

(60) Provisional application No. 60/834,087, filed on Jul. 28, 2006.

(51) Int. Cl.
*A63D 15/08* (2006.01)

(52) U.S. Cl. .......................................... 473/44; 473/47

(58) Field of Classification Search ............. 473/44–51
See application file for complete search history.

(56) References Cited

U.S. PATENT DOCUMENTS

| 132,054 | A | | 10/1872 | Coan et al. |
|---|---|---|---|---|
| 672,646 | A | | 4/1901 | Mereness, Jr. |
| 951,453 | A | | 3/1910 | Ransom |
| 1,241,194 | A | | 9/1917 | Carlson et al. |
| 1,248,634 | A | | 12/1917 | Du Bose |
| 1,552,442 | A | | 9/1925 | Lund |
| 3,334,901 | A | | 8/1967 | Steffes |
| 3,965,590 | A | * | 6/1976 | Algaze ........................ 40/660 |
| 4,943,333 | A | | 7/1990 | Chang |
| 5,514,039 | A | | 5/1996 | Gendron et al. |
| 5,643,095 | A | | 7/1997 | Probst |
| 5,725,437 | A | | 3/1998 | McCarty et al. |
| 5,749,788 | A | | 5/1998 | Bourque |
| 5,820,473 | A | | 10/1998 | Lambros |
| 6,132,321 | A | | 10/2000 | Wethered |
| 6,162,128 | A | | 12/2000 | McCarty et al. |
| 6,348,006 | B2 | | 2/2002 | Costain et al. |
| 6,398,660 | B1 | * | 6/2002 | Probst et al. ................... 473/44 |
| 6,869,370 | B2 | | 3/2005 | Davtyan et al. |
| 7,044,861 | B1 | | 5/2006 | Nally et al. |
| 2002/0072423 | A1 | | 6/2002 | Pot |
| 2003/0050129 | A1 | * | 3/2003 | Kuo ........................... 473/44 |
| 2003/0166419 | A1 | | 9/2003 | Gulyassy |
| 2004/0116196 | A1 | | 6/2004 | Nazaruk |
| 2004/0224781 | A1 | * | 11/2004 | Davtyan et al. ............... 473/44 |
| 2006/0089203 | A1 | | 4/2006 | Costain et al. |
| 2006/0205525 | A1 | * | 9/2006 | Owen .......................... 473/44 |

(Continued)

FOREIGN PATENT DOCUMENTS

GB   2046600 A   * 11/1980

(Continued)

*Primary Examiner*—Mark S Graham
(74) *Attorney, Agent, or Firm*—Hamilton, Brook, Smith & Reynolds, P.C.

(57) ABSTRACT

A cue stick including a butt shaft having a proximal end and a distal end. A first vibration damping insert can be secured within the distal end of the butt shaft and can be formed of vibration damping material. A first joint member can be secured within the first vibration damping insert. The first joint member is for securing to a mating cue stick portion.

26 Claims, 6 Drawing Sheets

U.S. PATENT DOCUMENTS

2006/0293111 A1* 12/2006 Chang .................. 473/44
2007/0060407 A1* 3/2007 Chang .................. 473/44

FOREIGN PATENT DOCUMENTS

| GB | 2 096 470 | 10/1982 |
| GB | 2253359 A * | 9/1992 |
| GB | 2 401 323 | 11/2004 |
| WO | WO 2005/007370 A1 | 1/2005 |

* cited by examiner

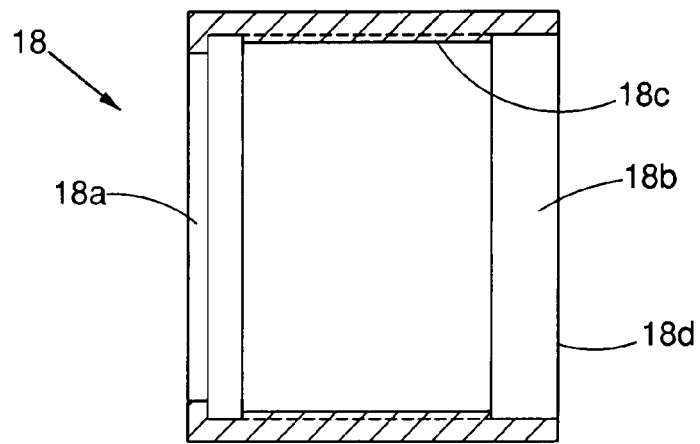
FIG. 8
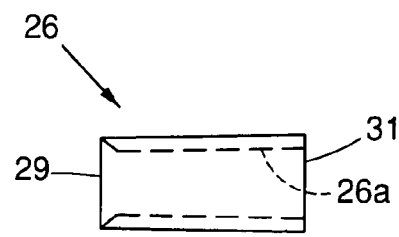
FIG. 9
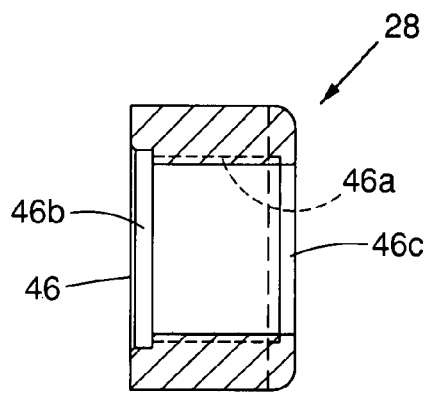 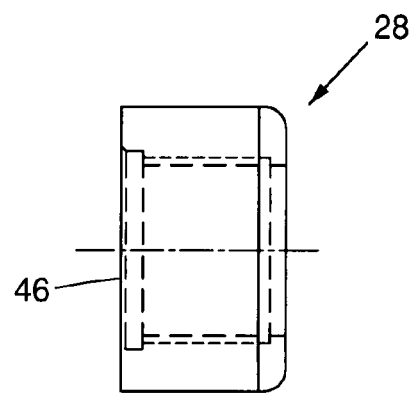
FIG. 10        FIG. 11

CUE STICK

RELATED APPLICATION

This application claims the benefit of U.S. Provisional Application No. 60/834,087, filed on Jul. 28, 2006. The entire teachings of the above application are incorporated herein by reference.

BACKGROUND

The wood in cue sticks can have properties that affect the appearance and performance of the cue stick. The butt of wood cue sticks often include decorative phenolic annular rings which are fitted and glued over a narrowed neck section of the butt and have an outer diameter that matches the adjacent diameter of the butt. The phenolic rings can shrink radially inwardly and become smaller in diameter than the adjacent diameter of the butt, resulting in an undesirable appearance. In addition, in a multiple piece cue stick, the coupling joints for securing the pieces together can be glued within the mating ends of the pieces. The glued coupling joints can shift into an off center position, thereby affecting the performance of the cue stick when assembled together.

SUMMARY

The present invention provides a cue stick construction that can be resistant to moisture related effects, and can provide a cue stick with a more consistent appearance and performance.

The present invention can provide a cue stick including a butt shaft having a proximal end and a distal end. A first vibration damping insert can be secured within the distal end of the butt shaft and can be formed of vibration damping material. A first joint member can be secured within the first vibration damping insert. The first joint member can be for securing to a mating cue stick portion.

In particular embodiments, the vibration damping material can be dimensionally stable under moisture changes, thereby limiting the movement of the first joint member out of concentricity. The first vibration damping insert can be formed of phenolic material and can be secured within a hole in the distal end of the butt shaft. The first joint member can include a pin having a male threaded region extending from the first vibration damping insert. A first hollow elongate decorative sleeve having proximal and distal ends can be mounted concentrically on the butt shaft. The proximal end can be trapped against a shoulder on the butt shaft. The first vibration damping insert can have a locking shoulder for locking the decorative sleeve against a shoulder on the butt shaft. Decorative rings including at least one phenolic ring can be positioned on the first vibration damping insert between the locking shoulder of the first vibration damping insert and the first decorative sleeve. Shrinking of the at least one phenolic ring can be limited by being positioned on the first vibration damping insert. A collar can be concentrically mounted on the first vibration damping insert and can surround the male threaded region of first joint member for protecting the male threaded region. A butt handle can be mounted to the proximal end of the butt shaft. The butt handle can include a second vibration damping insert formed of vibration damping material and can be secured within and extend from the hole in the proximal end of the butt shaft. A second hollow elongate decorative sleeve can be mounted concentrically on the second vibration damping insert. An end piece can be secured to the second vibration damping insert. The second decorative sleeve can be locked in place between the proximal end of the butt shaft and the end piece. The second vibration damping insert can be formed of phenolic material. Decorative rings including at least one phenolic ring can be positioned on the second vibration damping insert between the at least one of the proximal end of the butt shaft and the second decorative sleeve, and the decorative sleeve and the end piece. Shrinking of the at least one phenolic ring can be limited by being positioned on the second vibration damping insert. A balance weight can be positioned within the interior of the second vibration damping insert. The cue stick can further include a cue shaft with a second joint member having a sleeve with a female threaded region for engaging the male threaded region of the first joint member to secure the cue shaft to the butt shaft. The butt shaft can be formed from a blank of at least four equally sized pieces of wood which are laminated together along planar mating joints that meet along a central axis for resisting warping. A vibration damping material can be laminated within joints between the pieces of wood.

The present invention can also provide a cue stick portion including at least four equally sized pieces of wood laminated along planar mating joints which meet along a central axis. Vibration damping material can be laminated within the joints between the pieces of wood. In particular embodiments, the vibration damping material can include fiber material in a binder resin.

The present invention can also provide a method of forming a cue stick including forming a butt shaft having a proximal end and a distal end. A first vibration damping insert can be secured within a distal end of the butt shaft and can be formed of vibration damping material. A first joint member can be secured within the first vibration damping insert. The first joint member is for securing to a mating cue stick portion.

In particular embodiments, the first vibration damping insert can be formed from a material that is dimensionally stable under moisture changes, thereby limiting movement of the first joint member out of concentricity. The first vibration damping insert can formed from phenolic material and secured within a hole in the distal end of the butt shaft. The first joint member can include a pin having a male threaded region extending from the first vibration damping insert. A first hollow elongate decorative sleeve having proximal and distal ends can be mounted concentrically on the butt shaft. The proximal end can be trapped against a shoulder on the butt shaft. The first vibration damping insert can have a locking shoulder for locking the decorative sleeve against the shoulder on the butt shaft. Decorative rings including at least one phenolic ring can be positioned on the first vibration damping insert between the locking shoulder of the first vibration damping insert and the first decorative sleeve. Shrinking of at least one phenolic ring can be limited by being positioned on the first vibration damping insert. A collar can be mounted concentrically on the first vibration damping insert and surround the male threaded region of the first joint member for protecting the male threaded region. A butt handle can be mounted to the proximal end of the butt shaft. The butt handle can include a second vibration damping insert formed of vibration damping material that is secured within and extends from a hole in the proximal end of the butt shaft. A second hollow elongate decorative sleeve can be mounted concentrically on the second vibration damping insert. An end piece can be secured to the second vibration damping insert. The second decorative sleeve can be locked in place between the proximal end of the butt shaft and the end piece. The second vibration damping insert can be formed from phenolic material. Decorative rings including at least one phenolic ring can be positioned on the second vibration damping insert between at least one of the proximal end of the butt shaft and the second decorative sleeve, and the decorative sleeve and the end piece. Shrinking of the at least one phenolic ring can be limited by being positioned on the second vibration damping insert. A balance weight can be positioned within the interior of the second vibration damping insert. The cue stick can further include a cue shaft with a second joint member having a sleeve with a female threaded region for engaging the male threaded region of the first joint member to secure the cue shaft to the butt shaft. The butt shaft can be formed from a blank of at least four equally sized pieces of wood that are laminated together along planar mating joints that meet along a central axis for resisting warping. A vibration damping material can be laminated within the joints between the pieces of wood.

The present invention can also provide a method of forming a cue stick portion including laminating at least four equally sized pieces of wood together along planar mating joints which meet along a central axis. Vibration damping material can be laminated within the joints between the pieces of wood. In particular embodiments, the vibration damping material can be formed from fiber material in a binder resin.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8 is a side sectional view of an embodiment of a collar.

FIG. 9 is an embodiment of a decorative sleeve for the butt handle.

FIG. 10 is a side sectional view of an embodiment of an end piece.

FIG. 11 is a side view of the end piece.

DETAILED DESCRIPTION

Figure 1:
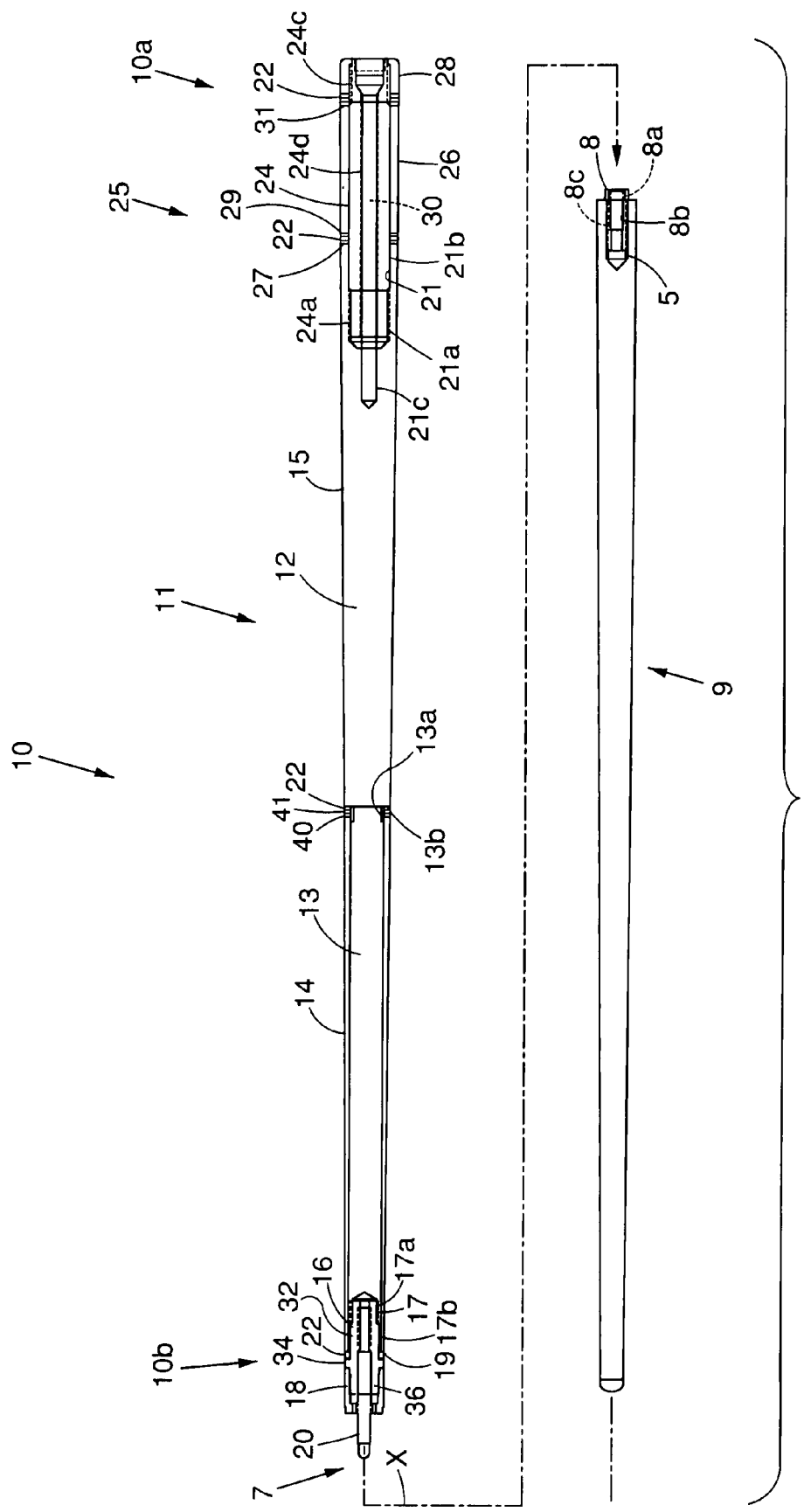
FIG. 1 is an exploded view of an embodiment of a cue stick in accordance with the present invention.
Figure 2:
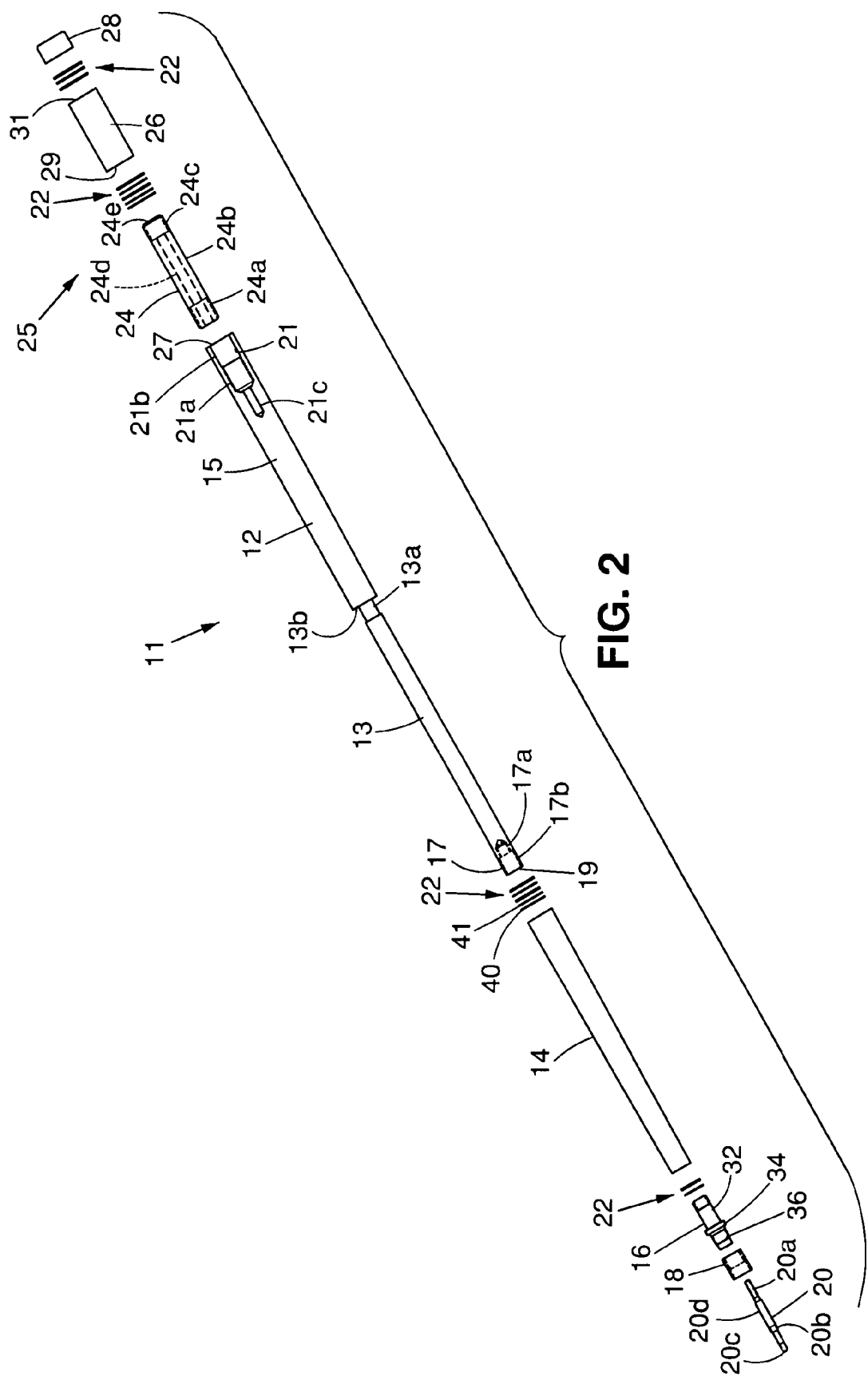
FIG. 2 is an exploded view of an embodiment of the butt portion.
Figure 3:
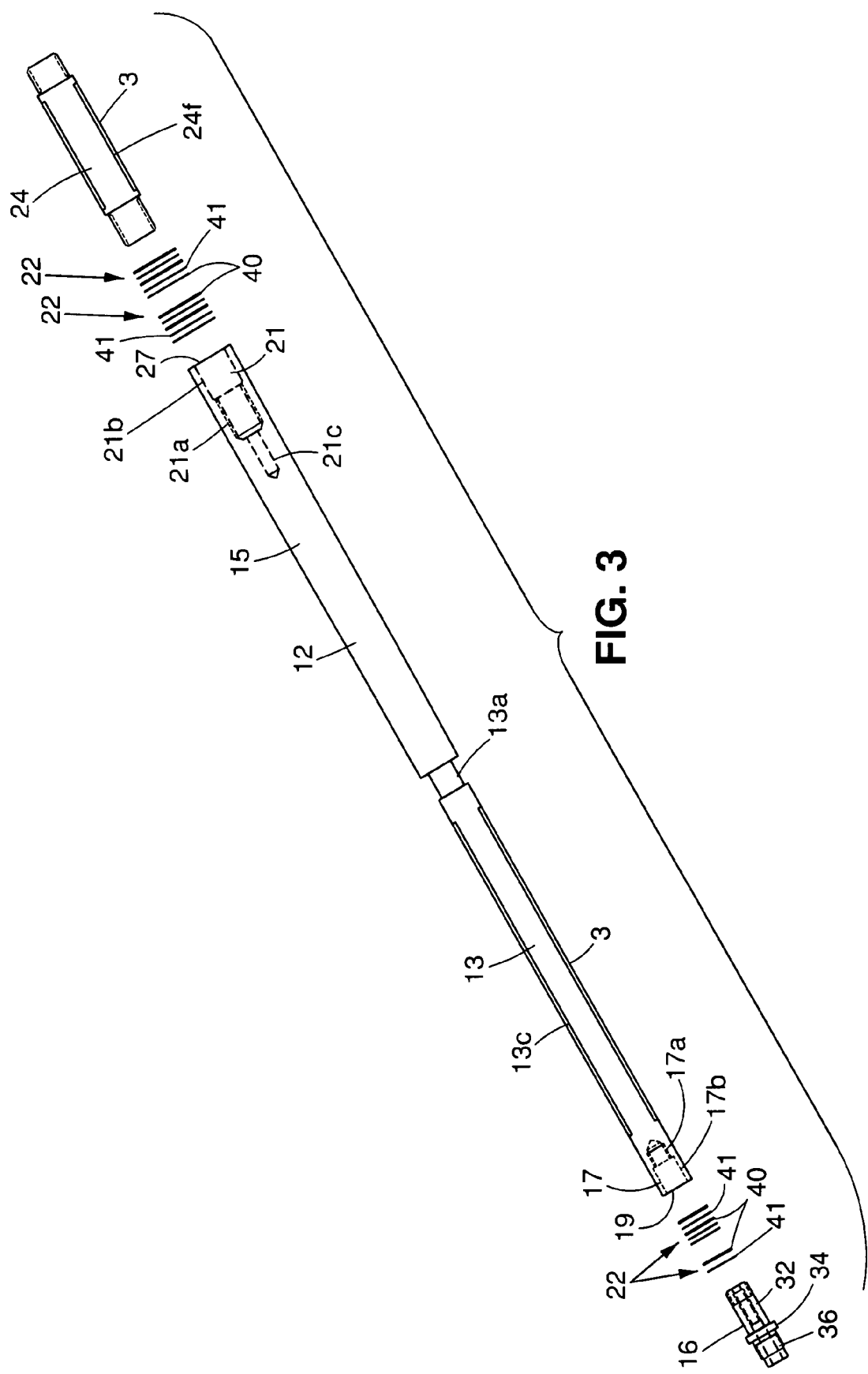
FIG. 3 is an exploded view of a portion of the parts of a butt portion.

Referring to FIGS. 1-3, cue stick 10 is an embodiment in the present invention which can include at least two cue stick portions, such as a butt shaft portion 11 and a tapered cue shaft portion 9, which can be assembled together on a central longitudinal axis X by a cue stick securement coupling or joint 7. The joint 7 can include a first or male butt coupling member, rod or pin 20 with a smooth tip 20c and a male threaded region 20b. The pin 20 can be concentrically secured to the distal end of the butt portion 11 along axis X. The joint 7 can also include a second or female shaft coupling member, sleeve or bushing 8 that can be concentrically secured to and within the proximal end of the shaft portion 9 along axis X.

The female bushing 8 can be secured within a hole 5 and can have an exterior male threaded region 8c for engaging hole 5. The female bushing 8 can also have a female threaded region 8a and a smooth bore 8b for mating and engaging with the smooth tip 20c and the male threaded region 20b of the pin 20, for securing the pin 20 to the bushing 8, thereby securing the butt 11 and shaft 9 portions together. The shaft portion 9 can be formed of wood, or can be made of composites, for example, carbon fiber. In some embodiments, the female bushing 8 can be omitted and the pin 20 can engage a hole formed directly in shaft portion 9.

The butt portion 11 can have a proximal butt end 10a and a distal securement end 10b. The butt portion 11 can have a main butt shaft body or portion 12 formed of a material such as wood. The main shaft body 12 can have a region 15 with a tapered diameter, and a narrowed neck region 13 with a shoulder 13b and a recessed diameter portion 13a.

Figure 4:
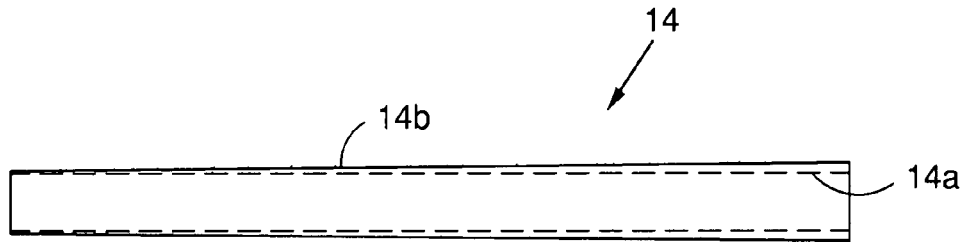
FIG. 4 is an embodiment of a decorative sleeve for the distal end of the butt portion.

A decorative sleeve 14 can be concentrically fitted over the narrowed neck region 13 along axis X. The decorative sleeve 14 (FIG. 4) can be hollow with an inner diameter 14a that can slide over the diameter of the narrowed neck region 13, and have a tapered outer diameter 14b that has a taper matching that of region 15 of the main shaft body 12. The decorative sleeve 14 can be made of materials and/or woods that do not have mechanical properties suitable for forming the entire butt portion 11, but have a pleasing decorative appearance. Various materials or designs can also be inlaid into the decorative sleeve 14. The narrowed neck region 13 can be contoured to accommodate inlaid designs extending through the wall of the decorative sleeve 14. The shoulder 13b can maintain the position of the decorative sleeve 14 on the narrowed neck region 13.

Figure 5:
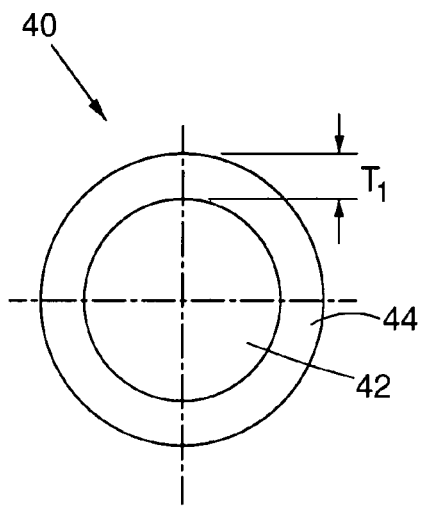
FIG. 5 is a front view of a decorative ring.
Figure 6:
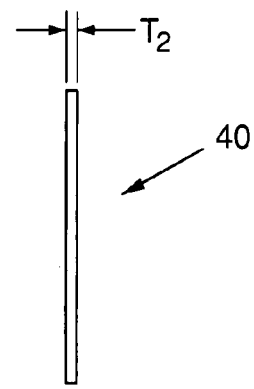
FIG. 6 is a side view of a decorative ring.

If desired, a series of decorative rings 22, including one or more phenolic rings 40 (FIGS. 5 and 6) and metallic or aluminum rings 41, can be positioned on the narrowed neck region 13 of the main shaft body 12 between the decorative sleeve 14 and the shoulder 13b concentrically along axis X. The inner diameter of the series of decorative rings 22 can be spaced radially outward from the recessed diameter portion 13a to avoid direct contact with the wood to limit or prevent shrinking of the phenolic rings 40. The recessed diameter portion 13a can be filled with an adhesive sealant such as epoxy to stabilize the series of decorative rings 22 and limit or prevent shrinking of the phenolic rings 40. Alternatively, a sleeve can be positioned over the recessed diameter portion 13a. The phenolic rings 40 can have an annular shape 44 surrounding a central hole 42, thereby forming a radial thickness $T_1$. The outer diameter, the diameter of the central hole 42 and the radial thickness $T_1$, can vary depending upon the location on the tapered butt portion 11. In addition, the edge thickness $T_2$ can be chosen as desired for appearance. The aluminum rings 41 can be made in a similar manner and can have a different edge thickness $T_2$.

Figure 7:
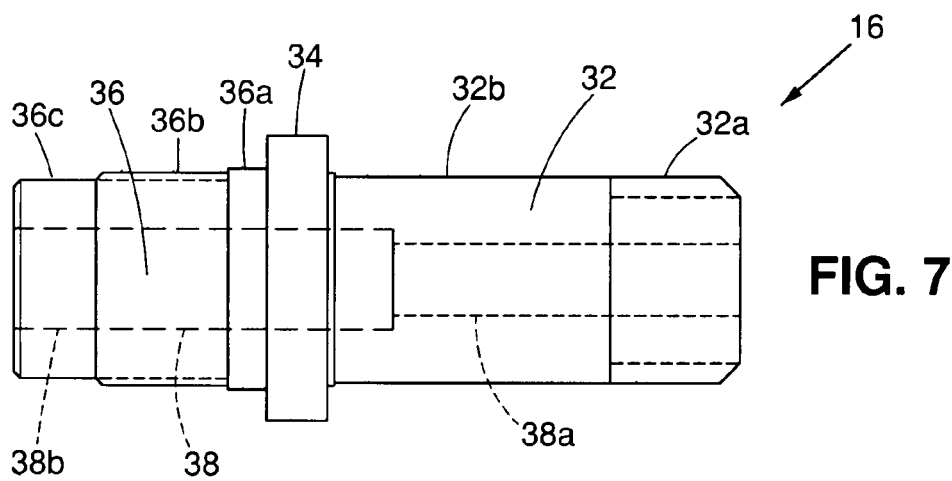
FIG. 7 is a side view of an embodiment of a distal vibration damping insert.

The decorative sleeve 14 can be locked into place concentrically onto the narrowed neck region 13 by a first, front or distal vibration damping insert 16 (FIG. 7) formed of vibration damping material. The vibration dumping insert 16 isolates the main shaft body 12 from the shaft portion 9 and can dampen vibrations from the shaft portion 9 during the striking of a cue ball. In addition to damping vibrations, the vibration damping insert 16 can be formed of a material that is dimensionally stable when exposed to moisture, or changes in moisture or humidity, and adhesives. The vibration damping insert 16 can be formed of a fibrous material that is bound in a resin, and in one embodiment, can be phenolic, such as linen reinforced phenolic, including NEMA L, MIL-I-24768, TYPE FBI, NEMA LE, MIL-J-24768 TYPE FEI. Alternatively, other suitable materials can be employed, such as piezoelectric material, cloth, or fibers, or other suitable fibers in a binder or resin, including fiberglass.

The vibration damping insert 16 can be generally cylindrical in shape having a butt securement end or side 32, a raised locking flange or shoulder 34, and a collar securement end or side 36. The butt securement side 32 can have a male threaded region 32a for securing the vibration damping insert 16 within a hole 17 in the distal end of the main shaft body 12 along axis X. Hole 17 can have a female threaded region 17a for mating with male threaded region 32a. The butt securement side 32 can also have a smooth male diameter portion 32b for engaging a smooth female diameter bore portion 17b of hole 17 for centering purposes. The raised locking shoulder 34 can force and lock, trap or capture the decorative sleeve 14 against the shoulder 13b. The length of the decorative sleeve 14 can be sized to terminate at the axial or distal end surface 19 of the main shaft body 12 so that the raised shoulder 34 can be tightened against both the decorative sleeve 14 and the main shaft body 12. Alternatively, if desired, the decorative sleeve 14 can end before or extend beyond the end surface 19. A series of decorative rings 22 can be positioned on the vibration damping insert 16 over the shaft of the butt securement side 32 and locked in place, trapped or captured between the raised shoulder 34 and the decorative sleeve 14 and the main shaft body 12 concentrically along axis X. When the series of rings 22 are glued in place, the phenolic rings 40 can be adhered in place with little or no radial shrinking. In the prior art when phenolic rings are typically glued over a wooden diameter, the wood draws the adhesive into the wood which can also draw the phenolic ring radially inward toward the wood, resulting in radial shrinking. The wood can also dry, thereby shrinking, and cause further shrinking of phenolic rings. The use of a dimensionally stable material even when exposed to moisture changes, such as phenolic material for the vibration damping insert 16, and positioning the series of decorative rings 22 over the insert 16, generally avoids the migration of adhesive and shrinking of the phenolic rings 40. The raised shoulder 34 can be sized to also appear as a decorative ring.

The collar securement side 36 of the vibration damping insert 16 on the opposite side of the raised shoulder 34 from the butt securement side 32 can have a male threaded region 36b for engaging and securing to the female threaded region 18c of a collar 18 (FIG. 8) for concentrically securing the collar 18 to the vibration damping insert 16 along axis X. The collar 18 can be generally tubular or cylindrical in shape and include a smooth bore portion 18b, adjacent to the female threaded region 18c at axial end surface 18d and an opening 18a at the opposite axial end. The collar 18 can surround the male threaded region 20b of the pin 20 for protecting the male threaded region 20b. A smooth male diameter portion 36a adjacent to the raised shoulder 34 can engage a smooth bore 18b of the collar 18 to center the collar 18 relative to the vibration damping insert 16. Surface 18d can be tightened against the raised shoulder 34 of the vibration damping insert 16. Opening 18a at the opposite axial end encircles the pin 20 and allows the male threaded region 20b to engage the female threaded region 8a of the female bushing 8. The smooth tip 20c can extend from and beyond the collar 18. The tip 36c of the vibration damping insert can have a smooth male diameter portion.

The pin 20 can have a male threaded region 20a for concentrically securing the pin 20 within a hole 38 in the vibration damping insert 16 along axis X. The hole 38 can have a female threaded region 38a. A smooth male diameter portion 20d adjacent to the male threaded region 20a can engage a smooth bore 38b within the vibration damping insert 16 for holding or positioning the pin 20 concentrically relative to the vibration damping insert 16 and the butt portion 11. The male threaded region 20b and the smooth tip 20c of the pin 20 extend from the side 36 of the vibration damping insert 16 along axis X. Since the pin 20 and the collar 18 are secured to the vibration damping insert 16, the pin 20 and collar 18 are isolated from the main shaft body 12 by the vibration damping insert 16. When the butt portion 11 is assembled with the shaft portion 9, the pin 20 is engaged with the female sleeve 8 and the collar 18 abuts the end surface of the shaft portion 9. Energy transferred from the shaft portion 9 to the pin 20 and the collar 18 during striking of a cue ball can be transferred to the vibration damping insert 16 before reaching the main shaft body 12 of the butt portion 11. As a result, the vibration damping insert 16 can isolate the main shaft body 12 from the shaft portion 9 and dampen vibration or energy before it reaches the main shaft body 12, resulting in a quieter strike, and the preventing or reducing the possibility of a buzzing sound during striking. In addition, the dimensional stability of the vibration damping insert 16 even where exposed to adhesives, moisture or humidity changes, can maintain the pin 20 and collar 18 in a desired concentric position, resulting in an even or consistent transfer of energy during striking. Adhesives and/or sealants can also seal the joint between the raised shoulder 34 of the vibration damping insert 16 and the main shaft body 12 and the decorative sleeve 14, to minimize moisture and humidity effects at the end surface 19 of main shaft body 12 and the end of the decorative sleeve 14.

The joint 7 can be coupled together in about one turn and can be similar to joints disclosed in U.S. Pat. No. 5,518,455, the contents of which are incorporated herein by reference, in its entirety. In other embodiments, other suitable types of joints can be employed, including multiple turn joints.

The butt portion 11 can have a butt handle 25 secured to the proximal end of the main shaft body 12 along axis X. The butt handle 25 can include a second, rear, proximal, or butt handle vibration damping insert 24 concentrically secured to the main shaft body 12, a hollow decorative sleeve 26 (FIG. 9) concentrically fitted over the vibration damping insert 24, and an end cap or piece 28 (FIGS. 10 and 11) secured to the vibration damping insert 24. Since the butt handle 25 is secured to the main shaft body 12 by the vibration damping insert 24, any vibrations within the main shaft body 12 that are transferred to the butt handle 25 can be damped, further reducing vibration. Consequently, the main shaft body 12 can have vibration damping inserts 16 and 24 at opposite axial ends of the main shaft body 12 for damping and/or isolating vibrations at opposite ends of the main shaft body 12. The decorative sleeve 26 can be made of materials and/or woods not suitable for the main shaft body 12 and can include inlaid designs. If desired, a series of decorative rings 22 can also be positioned in desired locations over the vibration damping insert 24 and a weighted bolt 30 can be positioned within the vibration damping insert 24 for balance purposes.

The vibration damping insert 24 can be formed of the same materials as vibration damping insert 16 and can be generally rod or tubular shaped. The vibration damping insert 24 can have male threaded regions 24a and 24c at opposite ends and a smooth diameter portion 24b in between (FIG. 2). When a weighted bolt 30 is employed, a hole 24d can extend longitudinally through the vibration damping insert 24. The vibration damping insert 24 can be secured to the main shaft body 12 by engaging male threaded region 24a with a female threaded region 21*a* of a hole 21 in the proximal end of the main shaft body 12. The smooth diameter portion 24*b* can engage a smooth bore region 24*b* of the hole 21 for centering purposes. Decorative sleeve 26 (FIG. 9) can be slid over and concentrically into position on the vibration damping insert 24, and locked in place by end piece 28. The end piece 28 can have a central opening with a female threaded region 46*a* for engaging the male threaded region 24*c*, a bore 46*b* for engaging the smooth diameter portion 24*b*, and a hole 46*c* for engaging the tip 24*e* of the vibration damping insert 24. The weighted bolt 30 can be inserted through the hole 46*c* in the end piece 46, as well as the hole 24*d* in the vibration damping insert 24, and secured in place within hole 21*c* in the main shaft body 12. The hole 21*c* can have a female threaded region.

A series of decorative rings 22 can be positioned between the end surface 27 of the main shaft body 12 and the end surface 29 of the decorative sleeve 26, and another series of decorative rings 22 can be positioned between the end surface 31 of the decorative sleeve 26 and the end piece 28, concentrically along axis X. Since the phenolic rings 40 are positioned over the dimensionally stable vibration damping insert 24, radial shrinking of the phenolic rings 40 can be limited or prevented in a manner similar to that previously discussed with regard to vibration damping insert 16. In addition, the length of the vibration damping 24 insert can remain stable so that spaces do not form between the series of rings 22, or adjacent to the decorative sleeve 26 in the longitudinal direction along axis X. The joint between the main shaft body 12 and the decorative sleeve 26 can be sealed to minimize moisture and humidity effects.

In some embodiments, referring to FIG. 3, damping material 3 such as piezoelectric material, cloth or fiber can be wrapped around narrowed neck region 13 within an annular recessed portion 13*c* for providing additional damping. In addition, damping material 3 can also be wrapped around the vibration damping insert 24 within an annular recessed portion 24*f*.

Figure 12:
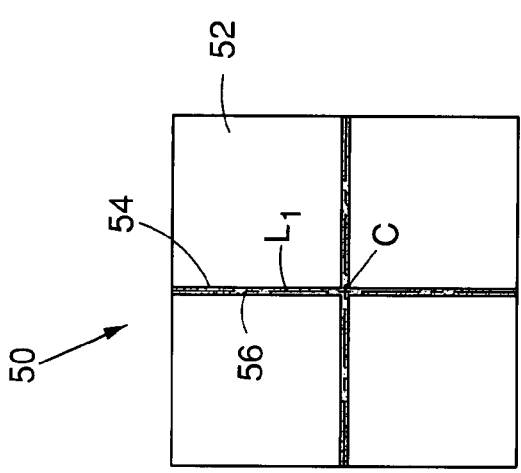
FIG. 12 is a cross-sectional view of one embodiment of a blank for the butt portion.

Referring to FIG. 12, the main shaft body 12 for butt portion 11 can be formed from a blank 50. The blank 50 can be formed from four elongate pieces or strips 52 of wood, each having an equal square cross section. The strips 52 of wood can be laminated together along planar or linear glue joints 54 which have equal lengths $L_1$ that meet at the center longitudinal axis C of the blank 50. The lengths $L_1$ of the glue joints 54 can extend vertically and horizontally, crossing or meeting each other at right angles. As a result, each strip 52 of wood can be glued to adjacent strips 52 of wood along right angles. Such a laminated joint configuration can provide glue joints 54 with an orientation, and lengths $L_1$ that can resist warping. The glue joints 54 can also include a vibration damping material 56 laminated within the glue joints 54 between the strips 52 of wood for providing damping characteristics. The vibration damping material 56 can extend longitudinally along axis C and laterally along lengths $L_1$, providing longitudinal and lateral direction damping. The damping material 56 can include various suitable fiber materials, cloth, piezoelectric cloth, etc., which can be within a binder or resin. The damping material 56 can also be phenolic for example, as described for the vibration damping insert 16. The vibration damping inserts 16 and 24 can also be made of the materials described for the damping material 56. In one embodiment, the blank 50 can be 2 inches square, having four 1 inch square strips 52 of wood, resulting in glue joints 54 having a length $L_1$ that are 1 inch long.

Figure 13:
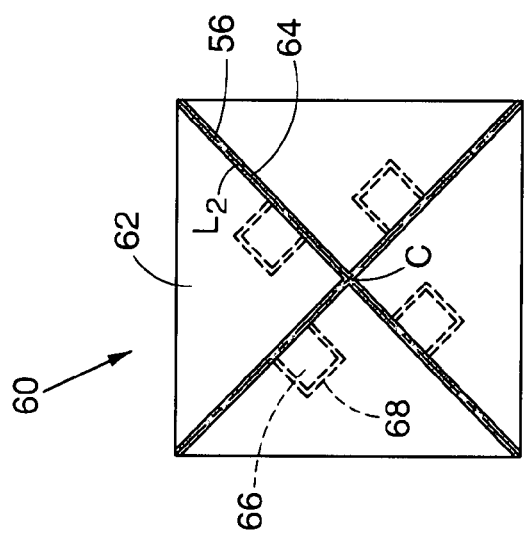
FIG. 13 is a cross-sectional view of another embodiment of a blank for the butt portion.

Referring to FIG. 13, blank 60 is another blank for forming main shaft body 12 for butt portion 11. Blank 60 can be formed of four elongate pieces or strips 62 of wood having equal triangular cross sections, laminated along glue joints 64 which can meet at the center longitudinal axis C of the blank 60 at right angles. The glue joints 64 have equal lengths $L_2$ which are greater than the lengths $L_1$ of blank 50 by about 40%, which can further resist warping. For example, for a 2 inch square blank 60, length $L_2$ can be about 1.41 inches, versus a length $L_1$ of 1 inch for a 2 inch square blank 50. Vibration damping material 56 can be included within the glue joints 64 in a similar manner as in blank 50, longitudinally along axis C and laterally along lengths $L_2$ providing lateral and longitudinal direction damping. If desired, each strip 62 can include an elongate joint protrusion 66 which engage mating grooves or pockets 68 in adjacent strips 62 and are glued. The vibration damping material 56 can extend into the grooves 68. The protrusions 66 and grooves 68 can also be employed in blank 50. In other embodiments, blanks can be laminated from more than four strips of wood, for example, 6, 8, 10, 12 pieces, etc.

Figure 14:
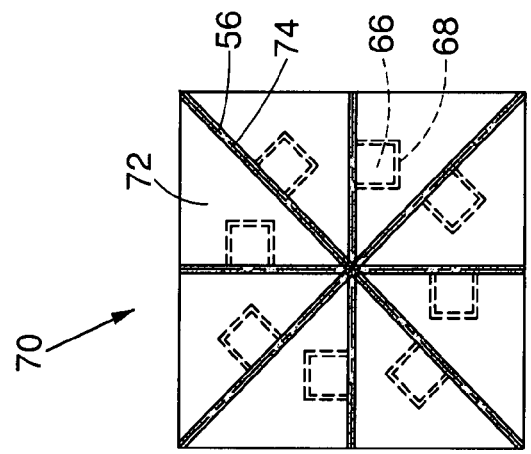
FIG. 14 is a cross-sectional view of another embodiment of a blank for the butt portion.

FIG. 14 depicts a blank 70 that is laminated from eight pieces or strips 72 of wood along glue joints 74. Blank 70 can include protrusions 66 and grooves 68.

One method of forming the butt portion 11 can be as follows. The strips of wood can be machined and laminated, adhered or glued together, for example by epoxy to form the desired blank, for example 50, 60 or 70. The blank can be turned on a lathe to desired dimensions to form main shaft body 12.

The decorative sleeve 14, vibration damping insert 16 and series of decorative rings 22 can be secured in place on the main shaft body 12 with adhesive or glue, using the raised shoulder 34 of the vibration damping insert 16 to secure and clamp the decorative sleeve 14 and series of decorative rings 22 in position. The vibration damping insert 16 can be secured in place before the hole 38 threaded region 36*b*, and diameters 36*a* and 36*c* of the vibration damping insert 16 are formed. The decorative sleeve 26, vibration damping insert 24, series of decorative rings 22 and end piece 28 can be secured and adhered or glued to the main shaft body 12 using the end piece 28 to secure and clamp the decorative sleeve 26 and the series of decorative rings 22 in position. The vibration damping insert 24 can be secured in place before the hole 24*d* is formed.

The assembled components can be further turned on a lathe to finish the assembly. The male threaded region 36*b* and diameters 36*a* and 36*c* can then be formed on the vibration damping insert 16. The collar 18 can then be secured and adhered or glued on side 36 of the vibration damping insert 16. Forming the male threaded region 36*b* and diameters 36*a* and 36*c* on the vibration damping insert 16 after finishing the assembled components on the lathe can allow the collar 18 to be more consistently concentrically positioned relative to the butt portion 11 along axis X. The hole 38 can then be formed within the vibration damping insert 16 and the pin 20 can be secured and adhered or glued in place. Again, machining the hole 38 after finishing the assembled components on the lathe allow the pin 20 to be more consistently concentrically positioned relative to the butt portion 11 along axis X. In addition, by being secured within the dimensionally stable vibration damping insert 16, the pin 20 can be more resistant to moving off center since there is no wood contacting the pin 20 which can shrink or expand, due to humidity or moisture changes, or, absorb the glue more readily in one direction, thereby moving the pin 20 out of concentricity. The holes 24*d* and 21*c* can be formed in the vibration damping insert 24 and the main shaft body 12, and the weight bolt 30 can then be secured in place in a concentric position.

The use of the vibration damping inserts 16 and 24 in the construction of the butt portion 11 can use 30% less wood. The laminated blanks 50 and 60 and/or the construction of the butt portion 11 can allow the use of heavier woods such as ebony, cocobolo, and mahogany, highly figured wood such as snake wood, rosewood, bubinga, etc., or burls, such as amboyna, thuya and padouk. In addition, the use of the vibration damping inserts 16 and 24 also allows more consistent and precise assembly with the components mounted thereto, than can be obtained with wood. The vibration damping inserts 16 and 24 also allow the balance point of the butt portion 11 to be adjusted by the appropriate choice of the weighted bolt, and can obtain balance points normally unachievable with solid wood butts. The vibration damping insert 16 can also seal the end grain of the wood at the surface 19 of the main shaft body 12 for example, with the raised shoulder 34, thereby limiting the amount of moisture transfer through the endgrain, and limiting undesirable dimensional changes of the main shaft body 12. The decorative sleeve 14 can be sealed off as well by the vibration damping insert 16. This can limit radial and longitudinal dimension changes of the main shaft body 12 and the decorative sleeve 14, which can cause cracking and gaps. Sealants can also be employed. The design and positioning of the vibration damping insert 16 can also limit or prevent dead spots near the pin 20.

In one embodiment, the main shaft body 12 can be about 24 inches long, decorative sleeve 14 can be about 11½ inches long, vibration damping insert 16 can be about 2¼ inches long, vibration damping insert 24 can be about 6 inches long and decorative sleeve 26 can be about 3 inches long. Such dimension can vary depending upon the situation at hand.

While this invention has been particularly shown and described with references to example embodiments thereof, it will be understood by those skilled in the art that various changes in form and details may be made therein without departing from the scope of the invention encompassed by the appended claims.

For example, although particular dimensions have been described for forming the components and the blanks, it is understood that such dimensions can vary depending upon the situation at hand. In addition, it is understood that the main shaft body 12 can be formed of other suitable materials, for example, composites. A vibration damping insert can also be positioned within shaft portion 9 to which bushing 8 can be secured. Furthermore, blanks for the main shaft body 12 can be made from unequal sized pieces of wood and have unequal or nonsymmetrical glue joints.

What is claimed is:

1. A cue stick comprising:
    a butt shaft, having a proximal end and a distal end;
    a first vibration damping insert secured within the distal end of the butt shaft formed of vibration damping material, the first vibration damping insert being formed of phenolic material and secured within a hole in the distal end of the butt shaft;
    a first joint member secured within the first vibration damping insert, the first joint member for securing to a mating cue stick portion, the first joint member comprising a pin having a male threaded region extending from the first vibration damping insert, the vibration damping material being dimensionally stable under moisture changes, thereby limiting movement of the first joint member out of concentricity; and
    a first hollow elongate decorative sleeve having proximal and distal ends mounted concentrically on the butt shaft, the proximal end trapped against a shoulder on the butt shaft, the first vibration damping insert having a locking shoulder for locking the decorative sleeve against the shoulder on the butt shaft.

2. The cue stick of claim 1 further comprising decorative rings including at least one phenolic ring positioned on the first vibration damping insert between the locking shoulder of the first vibration damping insert and the first decorative sleeve, shrinking of the at least one phenolic ring being limited by being positioned on the first vibration damping insert.

3. The cue stick of claim 2 further comprising a collar concentrically mounted on the first vibration damping insert and surrounding the male threaded region of the first joint member for protecting the male threaded region.

4. The cue stick of claim 1 further comprising a butt handle mounted to the proximal end of the butt shaft, the butt handle comprising:
    a second vibration damping insert formed of vibration damping material secured within and extending from a hole in the proximal end of the butt shaft;
    a second hollow elongate decorative sleeve mounted concentrically on the second vibration damping insert; and
    an end piece secured to the second vibration damping insert, the second decorative sleeve being locked in place between the proximal end of the butt shaft and the end piece.

5. The cue stick of claim 4 in which the second vibration damping insert is formed of phenolic material.

6. The cue stick of claim 5 further comprising decorative rings including at least one phenolic ring positioned on the second vibration damping insert between at least one of the proximal end of the butt shaft and the second decorative sleeve and the decorative sleeve and the end piece, shrinking of the at least one phenolic ring being limited by being positioned on the second vibration damping insert.

7. The cue stick of claim 6 further comprising a balance weight positioned within the interior of the second vibration damping insert.

8. The cue stick of claim 1 further comprising a cue shaft having a second joint member comprising a sleeve with a female threaded region for engaging the male threaded region of the first joint member, thereby securing the cue shaft to the butt shaft.

9. The cue stick of claim 1 in which the butt shaft is formed from a blank of at least four equally sized pieces of wood which are laminated together along planar mating joints that meet along a central axis for resisting warping.

10. The cue stick of claim 9 further comprising a vibration damping material laminated within the joints between the pieces of wood.

11. The cue stick of claim 1 in which the butt shaft is formed from a blank that comprises:
    at least four equally sized pieces of wood laminated together along planar mating joints which meet along a central axis; and
    vibration damping material laminated within the joints between the pieces of wood.

12. The cue stick portion of claim 11 in which the vibration damping material comprises fiber material in a binder resin.

13. A method of forming a cue stick comprising:
    forming a butt shaft having a proximal end and a distal end;
    securing a first vibration damping insert within the distal end of the butt shaft, the first vibration damping insert being formed of vibration damping material, the first vibration damping insert formed from phenolic material and secured within a hole in the distal end of the butt shaft;

securing a first joint member within the first vibration damping insert, the first joint member for securing to a mating cue stick portion, the first joint member comprising a pin having a male threaded region extending from the first vibration damping insert, the first vibration damping insert being dimensionally stable under moisture changes, thereby limiting movement of the first joint member out of concentricity; and mounting a first hollow elongate decorative sleeve having proximal and distal ends concentrically on the butt shaft, the proximal end trapped against a shoulder on the butt shaft, the first vibration damping inset having a locking shoulder for locking the decorative sleeve against the shoulder on the butt shaft.

14. The method of claim 13 further comprising positioning decorative rings including at least one phenolic ring on the first vibration damping insert between the locking shoulder of the first vibration damping insert and the first decorative sleeve, shrinking of the at least one phenolic ring being limited by being positioned on the first vibration damping insert.

15. The method of claim 14 further comprising mounting a collar concentrically on the first vibration damping insert and surrounding the male threaded region of the first joint member for protecting the male threaded region.

16. The method of claim 13 further comprising mounting a butt handle to the proximal end of the butt shaft, the butt handle comprising:
a second vibration damping insert formed of vibration damping material secured within and extending from a hole in the proximal end of the butt shaft;
a second hollow elongate decorative sleeve mounted concentrically on the second vibration damping insert; and
an end piece secured to the second vibration damping insert, the second decorative sleeve being locked in place between the proximal end of the butt shaft and the end piece.

17. The method of claim 16 further comprising forming the second vibration damping insert from phenolic material.

18. The method of claim 17 further comprising positioning decorative rings including at least one phenolic ring on the second vibration damping insert between at least one of the proximal end of the butt shaft and the second decorative sleeve and the decorative sleeve and the end piece, shrinking of the at least one phenolic ring being limited by being positioned on the second vibration damping insert.

19. The method of claim 18 further comprising positioning a balance weight within the interior of the second vibration damping insert.

20. The method of claim 13 further comprising forming a cue shaft having a second joint member comprising a sleeve with a female threaded region for engaging the male threaded region of the first joint member, thereby securing the cue shaft to the butt shaft.

21. The method of claim 13 further comprising forming the butt shaft from a blank of at least four equally sized pieces of wood which are laminated together along planar mating joints that meet along a central axis for resisting warping.

22. The method of claim 21 further comprising laminating a vibration damping material within the joints between the pieces of wood.

23. The method of claim 13 further comprising forming the butt shaft from a blank formed by:

laminating at least four equally sized pieces of wood together along planar mating joints which meet along a central axis; and
laminating vibration damping material within the joints between the pieces of wood.

24. The method of claim 23 further comprising forming the vibration damping material from fiber material in a binder resin.

25. A cue stick comprising:
a butt shaft, having a proximal end and a distal end;
a unitary first vibration damping insert secured within the distal end of the butt shaft formed of vibration damping material, the first vibration damping insert being formed of phenolic material and secured within a hole in the distal end of the butt shaft;
a first joint member having a securement portion secured to and within the first vibration damping insert, the first joint member extending from the first vibration damping insert for securing to a mating cue stick portion, the first joint member being vibrationally damped and isolated from the butt shaft by the vibration damping material of the unitary first vibration damping insert, the first joint member comprising a pin having a male threaded region extending from the first vibration damping insert, the vibration damping material being dimensionally stable under moisture changes, thereby limiting movement of the first joint member out of concentricity; and
a first hollow elongate decorative sleeve having proximal and distal ends mounted concentrically on the butt shaft, the proximal end trapped against a shoulder on the butt shaft, the first vibration damping insert having a locking shoulder for locking the first decorative sleeve against the shoulder on the butt shaft.

26. A method of forming a cue stick comprising:
forming a butt shaft having a proximal end and a distal end;
securing a unitary first vibration damping insert within the distal end of the butt shaft, the first vibration damping insert being formed of vibration damping material, the first vibration damping insert formed from phenolic material and secured within a hole in the distal end of the butt shaft;
securing a securement portion of a first joint member to and within the first vibration damping insert, the first joint member extending from the first vibration damping insert for securing to a mating cue stick portion the first joint member being vibrationally damped and isolated from the butt shaft by the vibration damping material of the unitary first vibration damping insert, the first joint member comprising a pin having a male threaded region extending from the first vibration damping insert, the first vibration damping insert being dimensionally stable under moisture changes, thereby limiting movement of the first joint member out of concentricity; and
mounting a first hollow elongate decorative sleeve having proximal and distal ends concentrically on the butt shaft, the proximal end trapped against a shoulder on the butt shaft, the first vibration damping insert having a locking shoulder for locking the first decorative sleeve against the shoulder on the butt shaft.

* * * * *

UNITED STATES PATENT AND TRADEMARK OFFICE
CERTIFICATE OF CORRECTION

PATENT NO. : 7,559,847 B2
APPLICATION NO. : 11/879491
DATED : July 14, 2009
INVENTOR(S) : Paul D. Costain and Karim Belhaj It is certified that error appears in the above-identified patent and that said Letters Patent is hereby corrected as shown below:

In Claim 6, Column 10, line 32, insert --second-- before "decorative";

In Claim 11, Column 10, line 56, insert --sheet cloth-- before "material";

In Claim 13, Column 11, line 12, delete "inset" and insert --insert--;

In Claim 18, Column 11, line 43, insert --second-- before "decorative";

In Claim 23, Column 12, line 4, insert --sheet cloth-- before "material".

Signed and Sealed this

Eighth Day of September, 2009

David J. Kappos
*Director of the United States Patent and Trademark Office*